June 18, 1957   P. VAN 'T SPIJKER   2,796,389
GAS-LIQUID SEPARATOR WITH QUENCHING MEANS AND SEPARATING METHOD
Filed Dec. 6, 1955
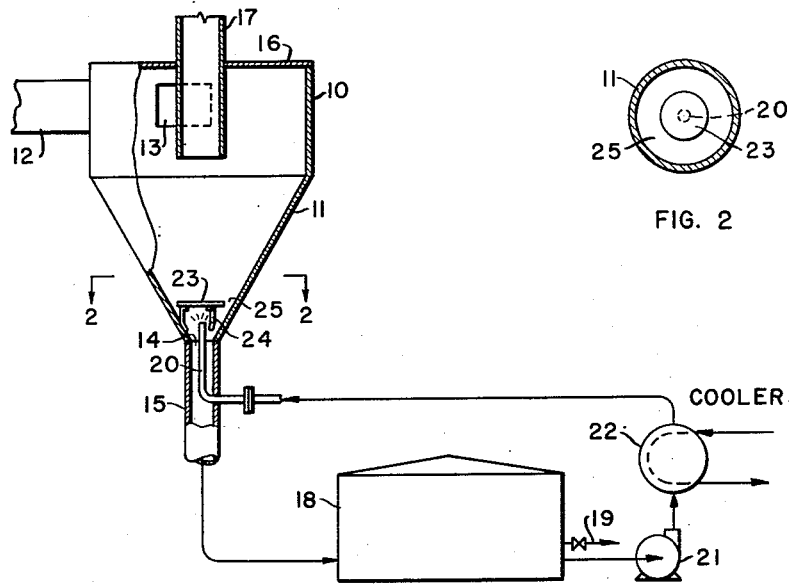
FIG. 2
FIG. 1
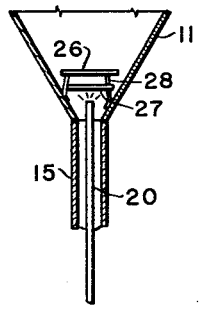
FIG. 3
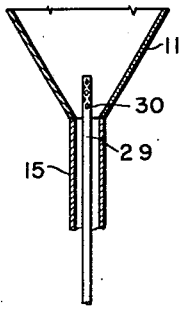
FIG. 4
INVENTOR:
PETER VAN'T SPIJKER
BY: *Oswald H. Wilmore*
HIS ATTORNEY United States Patent Office 2,796,389
Patented June 18, 1957

2,796,389

GAS-LIQUID SEPARATOR WITH QUENCHING MEANS AND SEPARATING METHOD

Peter van 'T Spijker, The Hague, Netherlands, assignor to Shell Development Company, New York, N. Y., a corporation of Delaware Application December 6, 1955, Serial No. 551,420

12 Claims. (Cl. 196—93)

The invention relates to a method and apparatus for effecting centrifugal separation between gas and liquid ("gas" being used generically to include vapor) and is particularly concerned with the separation of heat-sensitive liquids at elevated temperatures at which there is danger of thermal decomposition of the liquid. It finds especial, although not exclusive, application in the treatment of streams of petroleum oil that have been heated to vaporize certain constituents, e. g., by flashing with or without cracking.

A stationary centrifugal separator of the type herein considered includes an enclosed centrifugation chamber, usually shaped as a surface of revolution, having one or more tangential inlets near one axial end for admitting the gas, burdened with liquid, in a direction to cause vertical motion thereof, an overflow outlet for discharging the dried gas from the vicinity of the chamber axis, and an underflow outlet for discharging the liquid, which collects near the radially outer part of the chamber. The terms overflow and underflow relate the outlets to the densities of the respective phases discharged and do not denote positions of the outlets. Such separators are sometimes classified as cyclones and whirl chambers, the invention being applicable to both types: In a cyclone the enclosing wall usually includes a tubular part, e. g., a cylinder, at the end of the tangential inlet, the overflow outlet is situated near said end and usually includes a discharge tube that extends axially into the centrifugation chamber for a part of the length thereof to form a vortex-finder, and the underflow outlet is at the opposite end, e. g., at the apex when the chamber is upright and closed at the bottom by downwardly convergent closure. In the whirl chamber both the overflow and underflow outlets are situated at the same end, which may be remote from the tangential inlet when the chamber is axially elongated; the overflow outlet is a central opening in an end closure of the chamber and the underflow outlet is situated either near or at the periphery or is arranged coaxially with the overflow opening.

From the foregoing description it is clear that the cyclone operates on the countercurrent principle and the whirl chamber on the parallel-flow principle, but this does not constitute any essential difference as regards the invention.

It has been found in practice in certain cases, for example in the separation of hydrocarbon droplets from gaseous hydrocarbons which have been heated to high temperatures, that the separated liquid which is discharged through the underflow outlet decomposes during separation in and flow through the centrifugal separator. In the case of hydrocarbons, under the said conditions considerable coke deposits occur in the centrifugation chamber; this often makes it necessary to shut down the separator for cleaning, which involves the shut-down of the other units associated with the separator. Apart from deposition of coke, decomposition of unvaporized constituents within the cyclone is detrimental to the separation because it creates fine droplets in a region of the separator wherein the liquid is already separated from the gas; such fine droplets are apt to be re-entrained in the gas and carried off thereby.

It has been proposed in the U. S. patent to Tyson, No. 2,305,046, to cool the wall of a cyclone separator by passing a coolant through an external jacket. This, however, produces an insufficient cooling effect on the materials within the separator because of the low heat transfer rates attainable with feasible temperature differences, and because it influences the liquid only after coming into contact with the cyclone wall. Such cooling of the cyclone wall, moreover, is apt to cool the vapors, causing condensation and resulting in the inclusion of condensed material in the liquid product which should occur only in the vapor.

It is the object of this invention to provide an improved method and apparatus for the centrifugal separation of heat-sensitive liquids from gases at elevated temperatures at which decomposition of the liquid can occur, wherein the liquid can be rapidly cooled to arrest decomposition of the liquid.

In summary, according to the invention, the said drawbacks are overcome almost entirely by bringing the separated liquid within the centrifugal separator into direct contact with a cooling medium which is injected into a lower region of the separator. The cooling medium may be an extraneous fluid; it is however, usually preferred to use a portion of the separated liquid which is withdrawn from the separator and which is passed through a suitable cooling device.

By this mode of operation the separated liquid is rapidly brought to a temperature at which further decomposition is unlikely to occur or, at least, greatly reduced, while the gas is not significantly cooled so that no condensation occurs.

The method may be practiced in a stationary centrifugal separator which is provided with an inlet pipe for the coolant, the said pipe having one or more discharge openings situated in the lower region of the separator, near the liquid-discharge opening. It is preferred to mount one or more horizontal plates in the lower part of the separator above said liquid-discharge opening and mounted in a peripherally spaced relation to the separator wall. The cooling medium is discharged upwardly against the plate and is thereby distributed for admixture to the separated liquid which flows down around the margins of the plate.

The invention will be further described with reference to the accompanying drawing forming a part of this specification and illustrating certain preferred embodiments, wherein:

Figure 1 is a vertical sectional view through a cyclone provided with the means for injecting coolant according to the invention;

Figure 2 is a sectional view taken on the line 2—2 of Figure 1; and

Figures 3 and 4 are fragmentary views of the lower part of the cyclone showing two modified arrangements.

Referring to Figures 1 and 2 of the drawings, there is shown a cyclone having a centrifugation chamber of conventional shape, including an outer wall having an upper cylindrical part 10 and a lower, frusto-conical, downwardly convergent section 11, both formed as surfaces of revolution about a vertical axis. An inlet duct 12 is disposed tangentially to the upper part and opens into the chamber through an inlet opening 13, whereby an entering feed stream of gas, burdened with liquid, forms a vortex from which the liquid is separated against the outer wall by centrifugal force. The lower section terminates at a liquid-discharge opening 14 which is connected to a liquid-discharge duct 15. The cyclone further includes a top closure 16 having a central opening through which extends an overflow discharge duct 17, which may extend into the chamber to a level below the lower edge of the opening 13 to form a vortex-finder which leads off the dried gas from the core of the vortex. The duct 15 may be connected to a tank 18 from which liquid can be discharged through an outlet 19.

The lower section of the cyclone contains a pipe 20 having an upwardly directed discharge opening at the upper end thereof and situated at the axis of the cyclone near the discharge opening 14. A cooling medium is admitted through the pipe 20, which conveniently extends upwards through the duct 15. The cooling medium may be liquid which is withdrawn from the tank 18 by a pump 21 and cooled in a heat exchanger 22. A plate 23 (herein called the bottom plate) is mounted within the lower section 11 above the discharge opening of the pipe 20 by brackets 24 and is of such size as to be peripherally spaced from the cyclone wall to provide an annular flow passage 25 through which separated liquid descends by gravity from the upper part of the cyclone.

In operation, a stream of gas containing droplets is admitted to the centrifugation chamber through the inlet 12. Such a stream may, for example, be a hydrocarbon oil that has been heated in a furnace at atmospheric or elevated pressure to incipient cracking temperature or to a higher temperature. Such a stream may have passed through a pressure-reducing valve to cause vaporization of certain constituents. The liquid which is separated against the cyclone wall by the centrifugal forces and which descends along the said wall through the annular passage 25 is quenched by the cooling medium which flows upward from the pipe 20 and is distributed by the plate 23 for lateral flow against the liquid. The bottom plate 23, in addition to distributing the cooling medium, prevents the latter from being ejected upwards into the core of the vortex, wherein there prevails a reduced pressure such as would otherwise cause the coolant to be in part entrained in the gas and carried out through the overflow duct 17. The bottom plate also restricts the cooling action for the greater region to the lower part of the cyclone, whereby condensation of the gas is minimized. Such condensation is objectionable both because it causes condensed constituents to enter the liquid product (it being usually desirable to include them in the gas) and because under some conditions it causes the deposition of coke or other carbonaceous matter.

Being distributed in all directions by the bottom plate, the cooling liquid is uniformly injected into the descending liquid, causing rapid quenching thereof to a temperature at which further chemical decomposition is prevented or occurs only at negligible rates.

It was found that with the construction shown in Figures 1 and 2, the bottom plate is under certain conditions cooled so intensively that condensation of the gases freed from the liquids takes place on the upper surface thereof; this leads to deposits of coke or other material. In cases where this is a problem it is preferred to employ the multiple-plate construction shown in Figure 2, whereby this difficulty is successfully overcome. In this construction there are two horizontal bottom plates, 26 and 27, spaced apart vertically and supported by brackets 28, the plates being peripherally spaced from the cyclone wall. The gas in the space between the two plates insulates the upper plate 26 thermally from the lower plate 27, whereby the former is at a temperature closely approaching that of the gas while only the lower plate is materially cooled by the cooling medium.

The invention can also be carried out in a cyclone wherein the bottom plate is omitted, as shown in Figure 4. In this case it is, however, desirable to take special precautions to prevent the cooling fluid from entering the low-pressure core of the vortex. To this end the coolant pipe 29 is closed at its upper end and has a plurality of lateral discharge openings 30, which may be circular holes or slots, for directing the cooling fluid toward the cyclone wall.

I claim as my invention:

1. Process for separating heat-sensitive liquid from a gas stream containing said liquid in the form of droplets comprising the steps of admitting said stream and liquid droplets at an elevated temperature at which chemical decomposition of said liquid can occur into an enclosed centrifugation chamber with a rotary motion about the axis of the chamber and forming a vortex therein, separating said droplets from the gas centrigually against the outer part of said chamber and flowing the separated liquid to a lower region of said chamber, discharging residual gas from the central region of the chamber, quenching said separated liquid by injecting a cooling medium at a temperature below said elevated temperature into said separated liquid within a lower region of the chamber, and discharging the quenched liquid together with the cooling medium from the bottom of the chamber.

2. Process according to claim 1 including the added steps of cooling a portion of the separated liquid discharged from the centrifugation chamber and injecting the cooled liquid into the centrifugation chamber as the said cooling medium.

3. Process according to claim 1 wherein said centrifugation chamber provides a free and direct path for said gas and liquid from the point of admission thereof through said central region substantially to said lower region of the chamber and said separated liquid is quenched while in contact with the said residual gas.

4. Process for separating unvaporized hydrocarbon oil constituents from a stream of vaporized oil constituents comprising the steps of admitting a feed stream of said vaporized and unvaporized oil constituents at an elevated temperature at which chemical decomposition of said unvaporized oil constituents can occur tangentially into the upper part of a cyclone chamber which has a downwardly convergent lower section and forming a vortex therein, separating said unvaporized constituents from the vaporized constituents centrifugally within the cyclone and flowing said separated constituents downwardly through said lower section, discharging the residual vaporized constituents at the top of the cyclone, quenching said separated constituents by injecting a cooling liquid into said unvaporized constituents within the said lower section, and discharging the quenched constituents together with the cooling liquid at the bottom of said lower section.

5. A centrifugal separator for separating heat-sensitive liquid from gas comprising an enclosing wall defining a centrifugation chamber; means for admitting a gas burdened with said liquid with a rotary motion into said chamber to form a vortex therein; a gas-discharge duct communicating with the central region of said chamber; a liquid-outlet for discharging separated liquid from a lower region of said chamber; and means for injecting a cooling medium exclusively into the lower region of said chamber for direct contact with the said separated liquid therein and discharge of said cooling medium together with said separated liquid.

6. In combination with the separator according to claim 5, a liquid-cooler; conduit means for feeding a portion of the liquid discharged from the centrifugation chamber through said liquid-outlet to said cooler; and conduit means for flowing cooled liquid from said cooler to the centrifugation chamber as the said cooling medium.

7. A separator according to claim 5 wherein said means for injecting the cooling medium includes a pipe extending into the chamber and having a discharge opening situated in the vicinity of said liquid-outlet, and the centrifugation chamber contains at least one bottom plate near to but above said discharge opening of the pipe, said bottom plate providing a passage for the downward flow of liquid on the sides thereof adjoining the said enclosing wall.

8. A separator according to claim 7 wherein said discharge opening of the pipe is directed upwardly against said bottom plate.

9. A separator according to claim 5 including a pair of vertically spaced bottom plates mounted within the lower region of the centrifugation chamber above the said means for injecting cooling medium, said bottom plates having their margins spaced from the enclosing wall to provide passages for the downward flow of liquid.

10. A separator according to claim 9 wherein said means for injecting the cooling medium includes a pipe extending into said chamber and having a discharge opening directed upwardly against the lower of said pair of plates.

11. A cyclone for separating heat-sensitive liquid from gas comprising an enclosing wall defining an upright centrifugation chamber and having a downwardly convergent lower section; a tangential inlet in the upper part for admitting gas burdened with said liquid to form a vortex; a gas-outlet at the top of said chamber; a liquid-discharge opening at the bottom of said lower section; at least one horizontal plate mounted within said lower section in peripherally spaced relation to the enclosing wall; an inlet pipe for cooling medium extending into the said lower section and having a discharge opening situated above said liquid discharge opening and beneath said plate for injecting cooling medium for direct contact with separated liquid.

12. A cyclone according to claim 11 wherein said discharge opening is directed to discharge cooling medium upwardly against the underside of said plate.

References Cited in the file of this patent

UNITED STATES PATENTS

| | | |
|---|---|---|
| 1,504,386 | Senseman | Aug. 12, 1924 |
| 2,354,674 | Fisher | Aug. 1, 1944 |